United States Patent [19]

Hyodo et al.

[11] Patent Number: 4,553,209
[45] Date of Patent: Nov. 12, 1985

[54] AUTOMOBILE SPEED CONTROL SYSTEM

[75] Inventors: Hitoshi Hyodo, Okazaki; Naoji Sakakibara, Chiryu; Shoji Kawata, Okazaki, all of Japan

[73] Assignee: Aisin Seiki Kabushiki Kaisha, Kariya, Japan

[21] Appl. No.: 451,912

[22] Filed: Dec. 21, 1982

[30] Foreign Application Priority Data

Dec. 21, 1981 [JP] Japan ................................ 56-206458
Dec. 21, 1981 [JP] Japan ................................ 56-206459

[51] Int. Cl.[4] ............................................. B60K 31/00
[52] U.S. Cl. ............................... 364/431.07; 123/352; 318/317; 180/179; 364/426
[58] Field of Search .................... 364/431.07, 424, 426; 324/166, 167; 307/519; 123/349–352, 440, 488, 492, 415; 180/179; 318/317, 318

[56] References Cited

U.S. PATENT DOCUMENTS

| | | | |
|---|---|---|---|
| 3,689,778 | 9/1972 | Sharp | 307/519 |
| 3,983,954 | 10/1976 | Noddings et al. | 180/179 |
| 4,133,406 | 1/1979 | Allerdist | 180/179 |
| 4,155,419 | 5/1979 | Mann | 123/352 |
| 4,202,424 | 5/1980 | Sakakibara et al. | 180/176 |
| 4,367,804 | 1/1983 | Sakakibara | 364/426 |
| 4,370,960 | 2/1983 | Otsuka | 123/440 |
| 4,402,376 | 9/1983 | Hayashi et al. | 123/350 |

Primary Examiner—Gary Chin
Assistant Examiner—Thomas G. Black
Attorney, Agent, or Firm—Sughrue, Mion, Zinn, Macpeak, and Seas

[57] ABSTRACT

An automobile speed control system which is capable of running at a speed which is the same as the desired memorized speed and which will be maintained constant even during momentary voltage interruptions in the system, is comprised of a discharge device such as a diode which is arranged between one end of a grounded capacitor in an integrating circuit and a line which supplies a voltage higher than that of said one end of the capacitor when a voltage power source is normal. When the voltage of the voltage power source drops, the terminal voltage of the capacitor decreases slowly and the electric charge of the capacitor is discharged. When the voltage of the voltage power source rises again, the circuit operates in the same manner as the operation thereof when the power switch is closed and the memorized automobile speed is not changed from the prior memorized speed.

3 Claims, 14 Drawing Figures

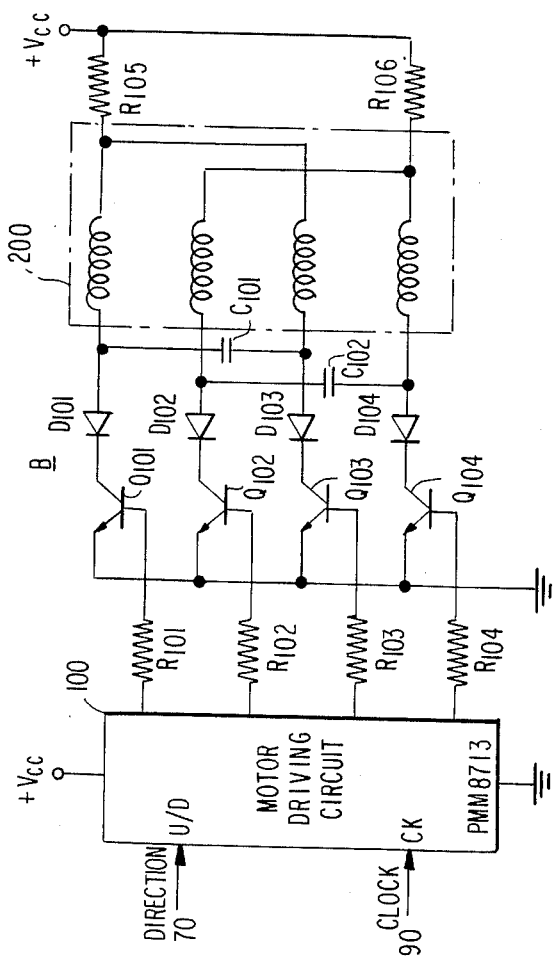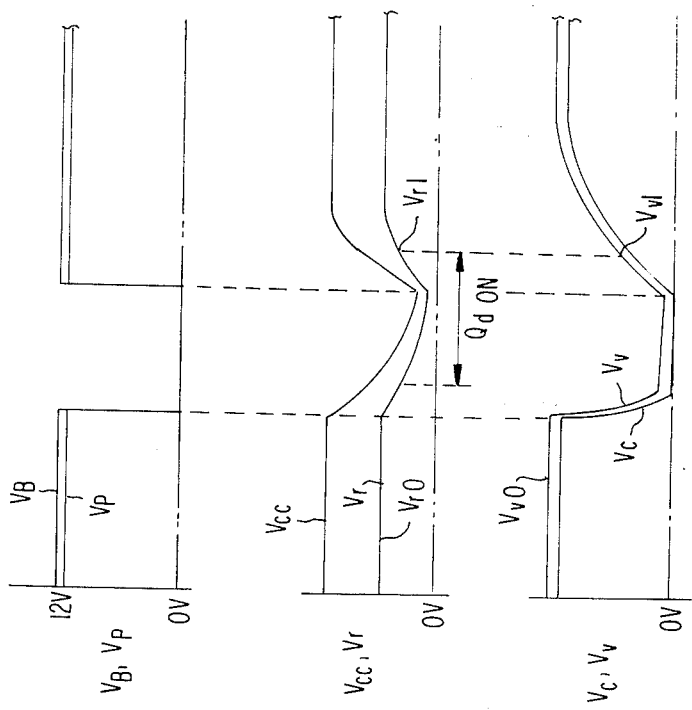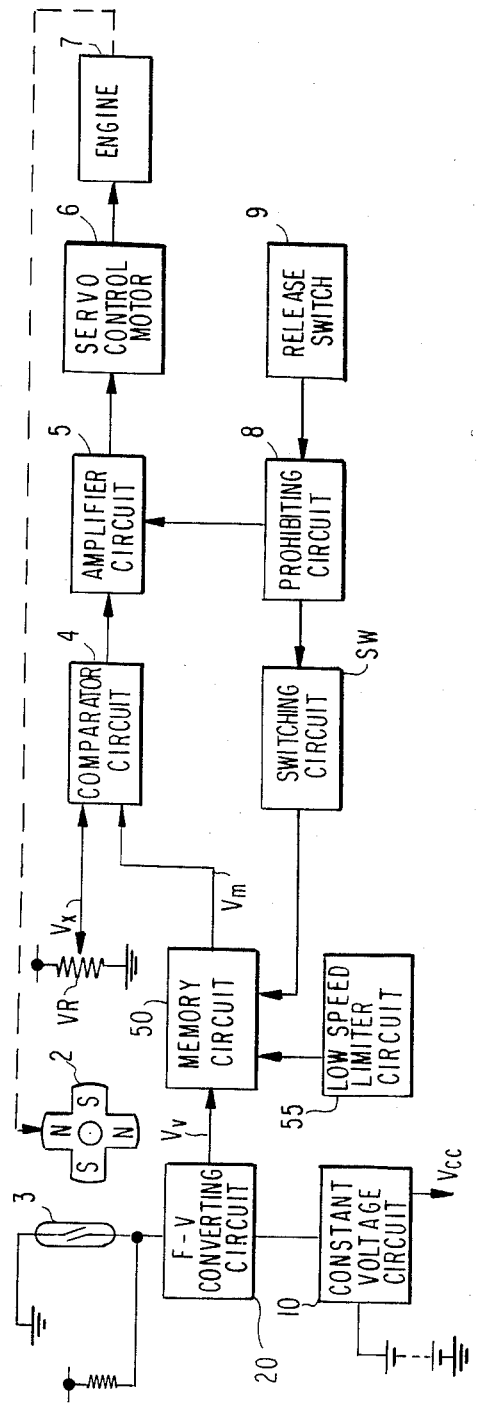

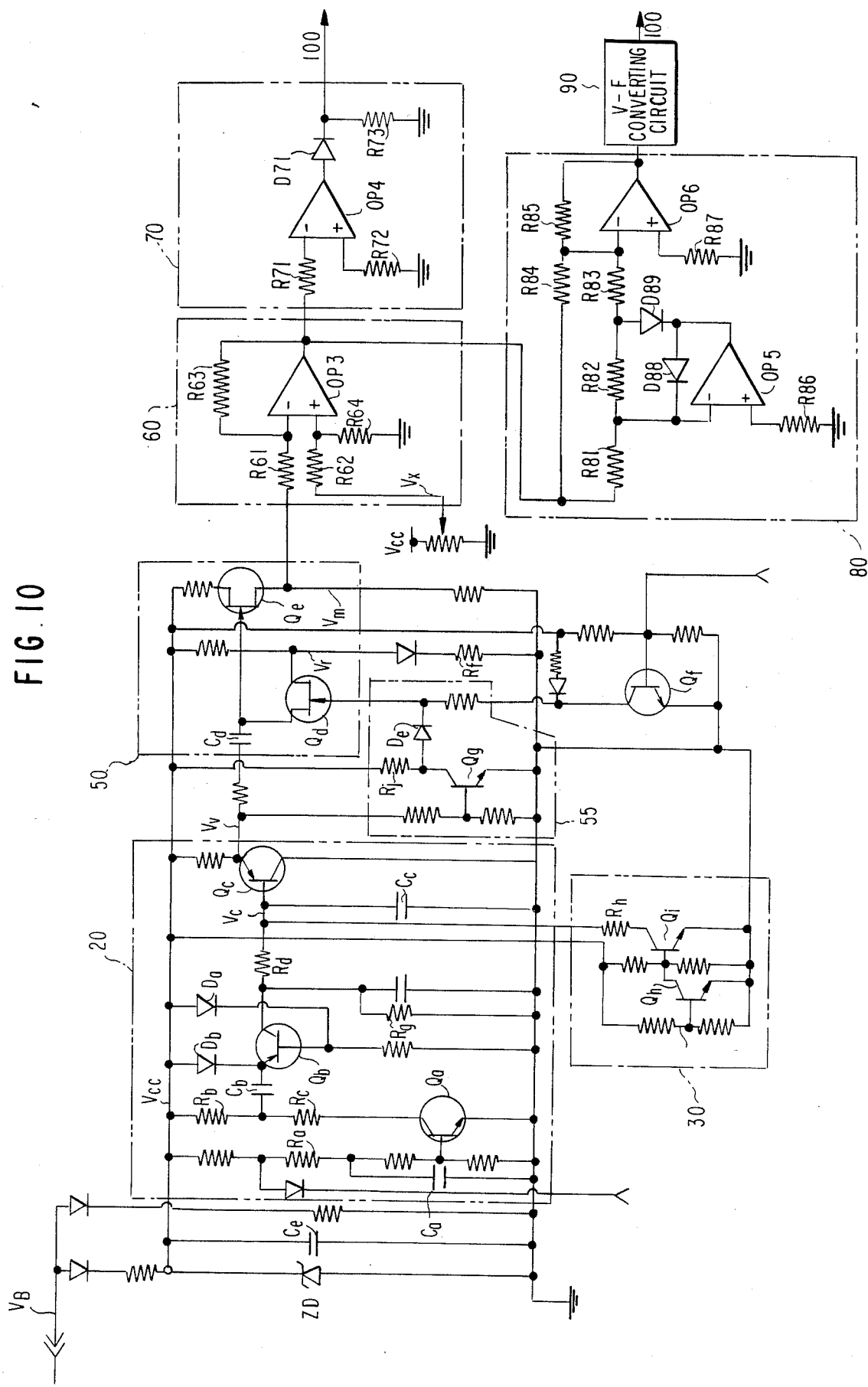

AUTOMOBILE SPEED CONTROL SYSTEM

BACKGROUND OF THE INVENTION

The present invention relates to an automobile speed control system for maintaining automobile speed at a desired speed and more particularly to a set, memory and cancel circuit arranged in an automobile speed control system for maintaining a constant speed.

In such controls, the actual speed of an automobile is detected at a pulse frequency and the actual speed signal is obtained by the analog voltage level which is in proporation to the pulse frequency. A memory circuit sets or memorizes the actual automobile speed signal at the moment that a desired speed switch is closed. This memorized automobile speed signal is then used as a reference signal by the comparator circuit and on the basis of the difference between the reference signal and the actual automobile speed, the automobile speed control system controls the movement of the throttle valve into a position at which the difference is zero.

In prior art, speed control devices for automobiles, a frequency-voltage converting circuit FVC and a memory circuit, or voltage holding circuit, FSH, are utilized as shown in FIG. 1. A constant voltage $V_{cc}$ regulated by Zener diode ZD is supplied to these circuits and the frequency-voltage converting circuit FVC receives an actual speed signal from a reed switch 3 which opens and closes repeatedly in synchronism with the rotation of a magnet 2 which is rotated at the same speed as the speedometer cable of an automobile. The frequency-voltage converting circuit FVC converts the actual speed signal into a voltage pulsating between the constant voltage level and the ground level and supplies the voltage to transistor $Q_a$ through resistor $R_a$ and capacitor $C_a$ which absorb the high frequency pulsation caused by chattering of the reed segment in the reed switch 3. The transistor $Q_a$ turns ON and OFF in correspondence with the actual speed signal so that the voltage level at the connection point between resistor $R_v$ and $R_c$ changes. According to the changes in the voltage level, capacitor $C_b$ is charged through the resistor $R_b$ and discharged through the resistor $R_c$. The base and emitter of transitor $Q_b$ are biased to the same voltage level through the diodes $D_a$ and $D_b$ respectively, and therefore, transistor $Q_b$ is OFF. When the voltage level at the connection point between resistors $R_b$ and $R_c$ is at a high level H, the emitter of transistor $Q_b$ is biased higher than the base thereof for the time determined by the time constant of resistor $R_b$ and capacitor $C_b$ so that the transistor $Q_b$ turns ON. The voltage at the collector of the transistor $Q_b$ is normally at the low level and when the transistor $Q_b$ is turned ON, the voltage at the collector changes to the high level so the voltage at the collector of transistor $Q_b$ is at the high level for the time determined by the time constant of the resistence of resistor $R_b$ and the capacity of capacitor $C_b$ in each frequency cycle of the actual speed signal. The pulse signal which has a constant pulse width caused by tran- sistor $Q_b$ is connected to an integrating circuit which is comprised of resistor $R_d$ and capacitor $C_c$ so that the voltage level of capcitor $C_c$ corresponds to the repetition rate of the pulse which is proportional to the actual speed signal and indicates the actual speed voltage signal through the transistor $Q_c$.

The memory circuit SH memorizes the actual speed voltage signal which indicates the desired speed of the automobile. The memory circuit SH includes a memory capacitor $C_d$, field effect transistors (FET) $Q_d$, $Q_e$, and resistor $R_e$. The source of FET $Q_d$ receives either the constant voltage $V_{cc}$ through resistor $R_e$ or is connected to ground through resistor $R_f$. In the state where the desired speed set signal is not supplied, the gate of FET $Q_d$ is at the low level whereby transistor $Q_f$ is in its ON state so that current cannot flow from the drain to the source. When the desired speed set signal is supplied, the voltage level of the gate of FET $Q_d$ switches to the high level whereby transistor $Q_f$ turns OFF so that current can flow from the drain to the source. One terminal of the capacitor $C_d$ is connected to the connection point between the resistor $R_e$ and resistor $R_f$ which indicate a reference voltage level $V_r$ and another terminal of the capacitor $C_d$ is connected to an actual speed voltage signal $V_v$. Therefore, the voltage difference $V_v - V_r$ is charged in the capacitor $C_d$. By taking off the desired set signal, FET $Q_d$ turns OFF because of FET $Q_e$ being a high impedance element, a terminal of capacitor $C_d$ which is connected to FET $Q_d$ is in the state of floating, so the electric charge of capacitor $C_d$ is held at the moment the desired speed set signal is taken off and therefore a differential voltage V of capacitor $C_d$ is held at the level of $V_v - V_r$. Thus, the voltage level $V_v$ plus V is applied to the gate of FET $Q_e$ and is supplied from the source of FET $Q_e$ as the memory voltage signal $V_m$. Thereafter, as the actual speed of the automobile rises, the memory voltage signal $V_m$ rises correspondingly and if the actual speed of the automobile decreases, the memory voltage $V_m$ falls correspondingly. By comparing this memory voltage signal $V_m$ with the constant voltage level $V_x$, the difference signal between the actual automobile speed and the desired automobile speed is supplied and an automobile speed control system will maintain the actual automobile speed constant at the desired speed.

However, in this type of automobile speed control system, when the power source is cut off momentarily by a faulty connector, memory voltage memorized in capacitor $C_d$ is changed and the automobile speed control system will make an error. FIG. 2 is a graph showing a time chart which indicates the level change of each signal when the power source voltage $V_b$ is cut off temporarily. Referring to FIG. 1 and FIG. 2, when the voltage $V_b$ drops to zero, the charge memorized in capacitor $C_e$ is discharged so that the voltage $V_{cc}$ decreases exponentially and the voltages $V_r$ and $V_v$ decrease also. The terminal voltage $V_c$ of capacitor $C_c$ in an integral circuit decreases, but because resistors $R_d$ and $R_g$ connected to capcitor $C_c$ have a high value, transistor $Q_c$ is biased oppositely and the voltage $V_c$ decreases more slowly than the voltages $V_{cc}$, $V_r$, and $V_v$. When the voltage $V_r$ decreases to a certain level at $T_1$, FET $Q_d$ turns ON, the voltage $V_v - V_r$ is applied to capcitor $C_d$. When the voltage $V_B$ returns to a fixed voltage at $T_3$, the voltages $V_{cc}$, $V_r$, $V_v$, and $V_c$ will begin to increase. If the voltage $V_r$ is over a certain voltage at the time $T_4$, FET $Q_d$ turns OFF and the voltage $V_{v1} - V_{r1}$ applied to capacitor $C_d$ is memorized in capacitor $C_d$. However, the voltage level of $V_{v1} - V_{r1}$ differs from the voltage level of $V_{v0} - V_{r0}$ which is memorized before the momentary voltage cut off. In practice, by cutting off the momentary voltage, the voltage memorized in capacitor $C_d$ is changed into a voltage which increases the automobile speed. For example, if a desired speed is set at 60 km/h, by cutting off the voltage momentarily it is possible that the speed will increase to 80 km/h. Therefore, it is dangerous to have an automobile run faster than the driver intends. While a driver can easily notice a change in speed due to a momentary cut off of voltage when a automobile is supposed to be running at a constant speed, it is very hard for the driver to notice the change of speed if the momentary voltage cutoff occurs at a time when the speed control system is not in operation. If the momentary voltage cutoff occurs during this time, the automobile will run at a higher speed than desired when the speed control system resumes control of the automobile speed.

SUMMARY OF THE INVENTION

Therefore, the present invention provides a new and improved automobile speed control system which obviates the above-mentioned drawback.

The present invention provides a new and improved automobile speed control system which is capable of running at a speed which is the same as the desired speed memorized in a memory circuit and which will be maintained constant even during momentary voltage interruptions in the system.

According to the present invention, a discharge means is arranged between one end of the capacitor, the other end of which is grounded in an integrating circuit and a line which supplies a voltage higher than that of said one end of the capacitor when a voltage power source is normal. A discharge means, for example, may be a diode with the anode of the diode connected to the end of the capacitor and the cathode of the diode connected to the line. When the voltage power source is normal, whereby the discharge means is biased in reverse, the electric charge of the capacitor is not discharged, but when the voltage of the voltage power source drops and the terminal voltage of the capacitor decreases slowly whereby the discharge means is biased, the electric charge of the capacitor is discharged. Because of the electric charge of the capacitor in an integrating circuit being discharged, when the voltage of the voltage power source rises again, the circuit operates in the same manner as the operation thereof when the power switch is closed. Therefore, a memorized automobile speed is not changed to a higher speed.

The foregoing and other objects, features and advantages of the invention will be apparant from the following more particular description of a preferred embodiment of the invention as illustrated in the accompanying drawings.

BRIEF DESCRIPTION OF THE DRAWINGS

FIG. 2b is a circuit diagram showing the details of a portion of the schematic circuit shown in FIG. 2a.

FIG. 2c is a time chart showing the various voltage signals in the circuit of FIG. 2a when the voltage power source is cut off momentarily.

FIG. 3 is a circuit diagram showing the details of a portion of the schematic circuit shown in FIG. 2a.

FIG. 9a is a schematic block circuit diagram of a second embodiment of the present invention.

FIG. 10 is a circuit diagram showing the details of a third embodiment according to the present invention.

DETAILED DESCRIPTION OF THE INVENTION

Figure 1:
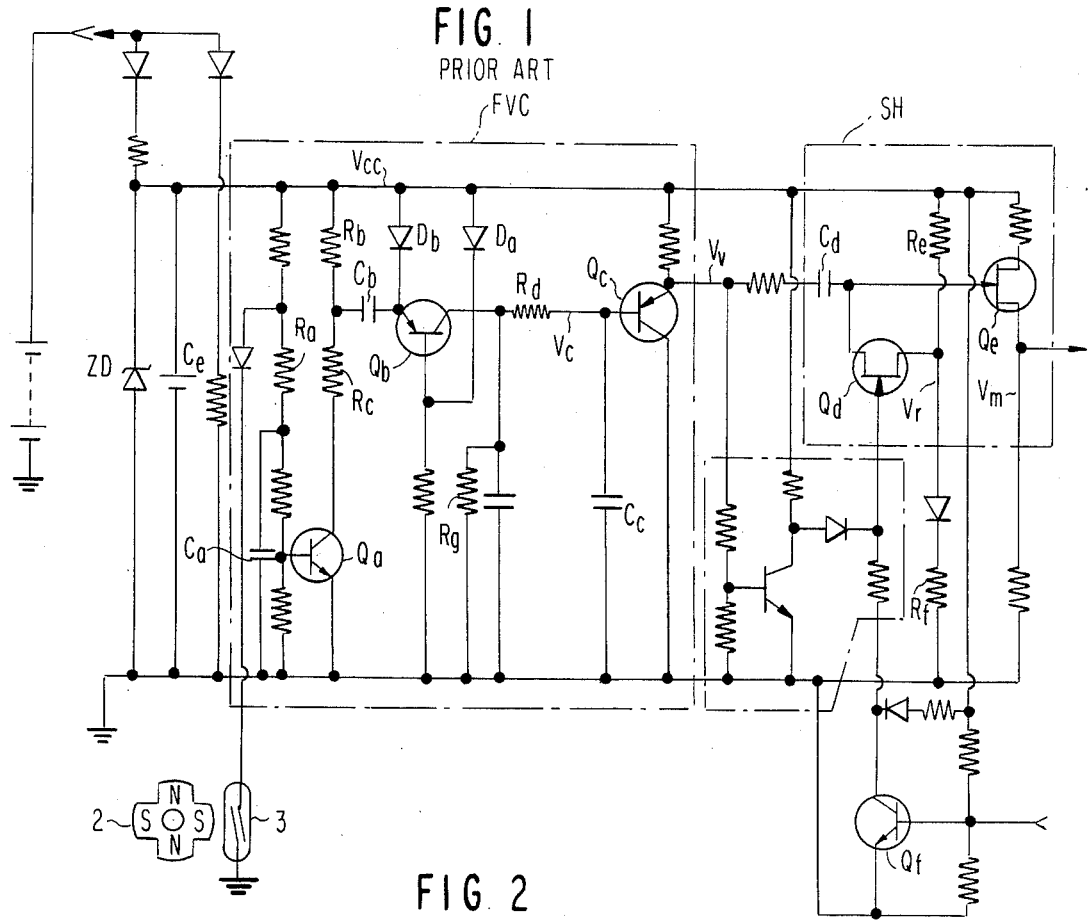
FIG. 1 illustrates a prior art frequency-voltage converting circuit and memory circuit for an automobile speed control system.
Figure 2:
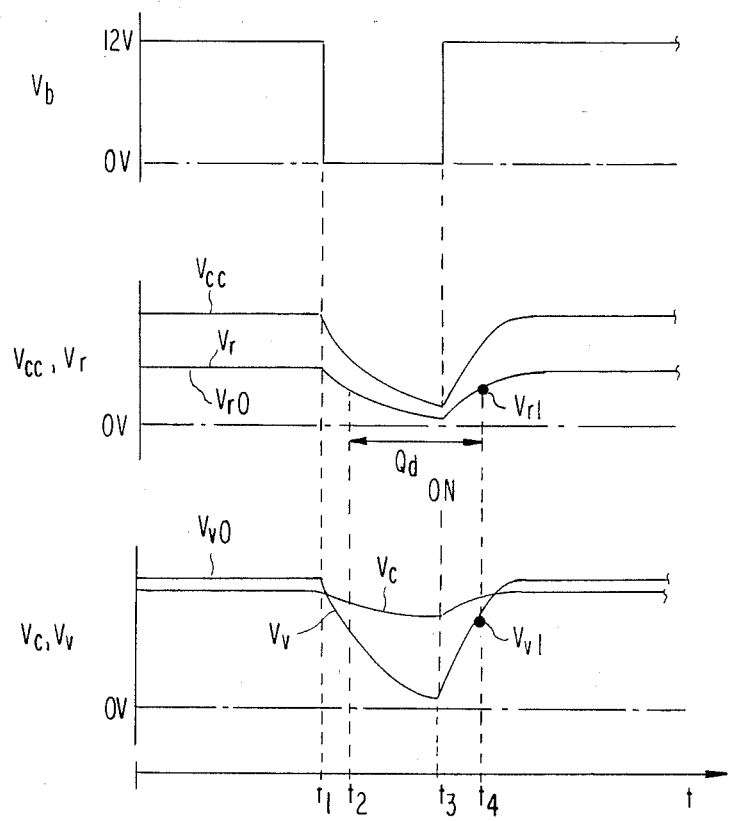
FIG. 2 is a time chart showing the signal of each circuit in FIG. 1 when the voltage power source is cut off momentarily.
Figure 2A:
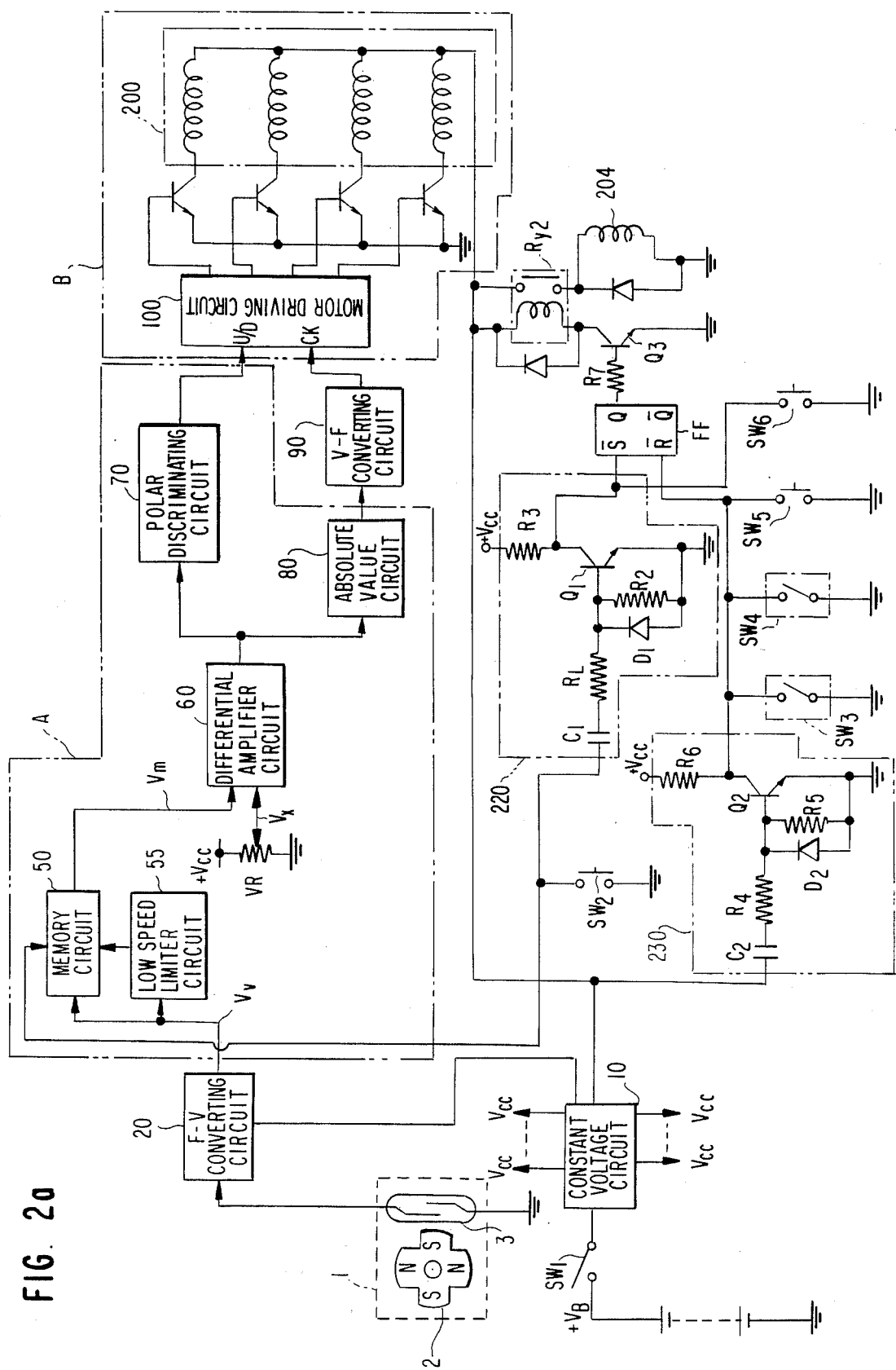
FIG. 2a is a schematic circuit representation of a first embodiment of the automobile speed control system according to the present invention.
Figure 2B:
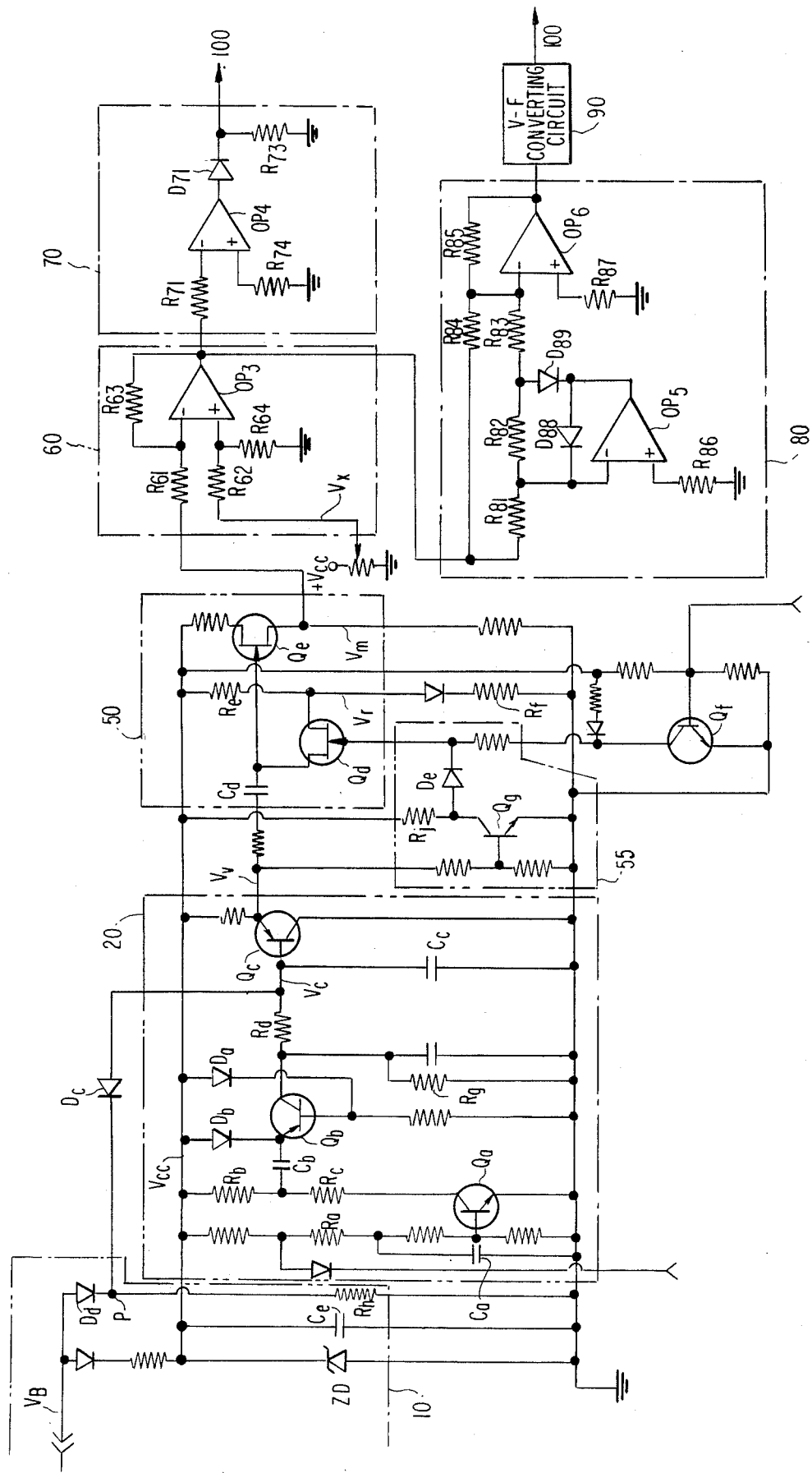

FIG. 2a is a schematic electrical circuit diagram of the automobile speed control system according to a first embodiment of the present invention wherein numerous portions of the circuit are shown in block diagram form. FIG. 2b is an electric circuit showing the details of the frequency-voltage converting circuit 20, the memory circuit 50, and other portions of the block diagrams shown in FIG. 2a. Referring specifically to FIG. 2b, a diode $D_c$ constitutes a discharge means in the practice of the present invention. The anode of diode $D_c$ is connected to integrating capacitor $C_c$ of the frequency-voltage converting circuit 20 and the cathode of the diode $D_c$ is connected to the connection point P between diode $D_d$ and resistor $R_h$. A voltage level at point P is approximately equal to the voltage $V_B$ of a voltage power supply so that the voltage level at point P changes in accordance with changes in the voltage $V_B$. The voltage level of the anode of diode $D_c$ or the terminal voltage $V_c$ of capacitor $C_c$ changes in response to a cycle of an acutal speed signal and the upper level of the voltage is lower than the voltage $V_{cc}$ which is stabilized by the Zener diode ZD, therefore, if the voltage $V_B$ is normal, the diode $D_c$ would not allow the passage of electric current whereby diode $D_c$ is biased in reverse. FIG. 2c is a time chart showing the signals when the voltage power circuit is cut off momentarily. When the voltage $V_B$ drops to zero at cutoff, the voltage level $V_p$ of point P decreases to zero and the diode $D_c$ is biased in a forward direction so that the charge of the capacitor $C_c$ is discharged. Therefore, the voltage $V_c$ drops and the voltage level $V_v$ of the actual speed signal is decreased. When the voltage $V_B$ recovers to a predetermined level, the voltages $V_{cc}$ and $V_r$ rise and if the voltage $V_r$ reaches a certain voltage $V_{rl}$ the difference voltage $V_{vl} - V_{rl}$ is memorized in capacitor $C_d$ so that FET $Q_d$ turns OFF. However, since the electrical charge of capacitor $C_c$ was discharged previously, the voltage $V_v$ rises slowly in accordance with the voltage $V_{cc}$ and the actual speed signal, so that the actual speed signal memorized in capacitor $C_d$ is lower than the speed signal memorized before. In this embodiment of the invention, the speed set control prohibition circuit 55 is applied. If the voltage $V_d$ is lower than the predetermined level (e.g. the voltage power supply is cut off) so that transistor $Q_g$ turns OFF, the gate of FET $Q_d$ is pulled up to a high voltage $V_{cc}$ through resistor $R_j$ and diode $D_e$. Thereby, even if transistor $Q_g$ is in the ON or OFF state, FET $Q_d$ will be conductive between the drain and the source and the voltage $V_r$ will be supplied to one end of capacitor $C_d$ and the voltage $V_v$ will be supplied to the other end of the capacitor $C_d$. Transistor $Q_g$ turns ON when the voltage $V_v$ reaches the level corresponding to the actual speed of 40 km/h at the same time the voltage $V_r$ reaches the voltage level $V_{ro}$ so if FET $Q_d$ turns OFF, the actual speed of 40 km/h is memorized in capacitor $C_d$.

Referring to FIG. 2a, the actual speed signal sensor includes a magnet 2 which is rotated at the same speed as the speedometer cable of an automobile. A reed switch 3 opens and closes repeatedly in synchronism with the rotation of the magnet 2. It is possible that the actual speed signal sensor 1 is a generator which generates pulses or a voltage in proportion to the actual speed. The output of the actual speed signal sensor 1 is connected to the frequency-voltage converting circuit 20 and is converted to an analog voltage which is proportional to the pulse frequency of the actual speed signal sensor 1.

The output of the frequency-voltage converting circuit 20, namely the actual speed signal, is memorized in the memory circuit 50 by closing the normally open set switch $SW_2$, thereby generating a memory indication signal (ground level signal). The output of the memory circuit 50, namely memory voltage signal $V_m$ is supplied to the differential amplifier circuit 60 and the difference or error signal between the comparative voltage signal $V_x$ supplied from the variable resistor VR and the signal $V_m$ is amplified by the circuit 60. The output of the differential amplifier circuit 60 is supplied to the polarity discriminating circuit 70 and the absolute value circuit 80. The circuit 70 distinguishes the polarity of the output of the amplifier 60, namely the error signal, and when the error signal is positive, that is, when the memory voltage signal is less than the actual speed voltage signal, it will supply a high level "1" and when the error signal is negative it will supply a low level "0". The circuit 70 supplies these signals wherein "1" is indicative of reverse rotation, that is, the closing direction of the throttle valve, and "0" is indicative of forward rotation, that is the opening direction of the throttle valve. A circuit 80 extracts the absolute value of the error signal and supplies this to the voltage-frequency converting circuit 90, which generates pulses of a frequency according to the voltage and supplies these pulses to the motor driving circuit 100. The motor driving circuit 100 makes four pairs of motor driving pulses from the pulses of the circiut 90 and supplies the four pairs of pulses to the base of the motor driving transistor by turns with respect to the signals indicating rotational directions (reverse rotation "1" and forward rotation "0"). Therefore, the stepping motor 200 rotates at a speed in accordance with the absolute value of the error signal and in a direction according to the polarity of the error signal.

In accordance with these combinations and operations, after closing the set switch $SW_2$, the motor 200 is immediately actuated in response to the acutal speed with the memory speed which is the automobile speed at switch $SW_2$ closed and the throttle valve is actuated through the electric clutch 205. When the set switch $SW_2$ is closed, the electrical charge which is held in capacitor $C_1$ of the differential pulse generating circuit 200 is immediately discharged to the ground and when the set switch $SW_2$ is changed to the open position, the capacitor $C_1$ is charged and a transistor $Q_1$ is turned ON momentarily by the voltage of resistor $R_2$ whereby a flip-flop FF is set. In other words, by closing the set switch $SW_2$ the actual speed is memorized in the memory circuit 50 and by opening the set switch $SW_2$ the flip-flop FF is set whereby relay $R_{y2}$ is turned ON and the electric clutch 205 is engaged. The output shaft of the stepping motor 200 is connected to the throttle valve through the clutch 205. By closing the manual reset switch $SW_5$, by closing the brake switch $SW_4$ for braking operation, or by closing the clutch switch for a clutch releasing operation, the flip-flop FF is reset and transistor $Q_3$ is turned OFF, the memory signal in memory circuit 50 is cleared and the relay $R_{y2}$ is turned OFF. With the electric clutch 205 being non-engaged, the connection between the throttle valve and the motor shaft is released. Therefore, the actual speed corresponds with the operation of the accelerator pedal. If the set switch $SW_2$ closes again, the acutal speed is memorized in the memory circuit 50 whereby the electric clutch 205 turns ON and when the set switch $SW_2$ opens the prescribed constant speed control is operated.

The constant power source circuit 10 supplies a predetermined voltage to each circuit shown in FIG. 2a. The battery voltage is supplied to the constant power source circuit 10 when the ignition switch $SW_1$ is closed. By closing the switch $SW_1$ and supplying the voltage to each circuit, each transistor $Q_2$ of the differential pulse generating circuit 230 is momentarily turned on whereby flip-flop FF is reset and the electric clutch 205 is in the OFF condition. The resume switch $SW_6$ is the switch for starting the constant speed control at the speed previously memorized in memory circuit 50 by closing the resume switch $SW_6$ and resetting flip-flop FF. The polarity discrimination circuit 70 which includes operational amplifier $OP_4$ and diode $D_{71}$ for cutting off negative output of the operational amplifier $OP_4$, supplies the signal which is at a high level "1" when the output differential amplfier 60 is positive and which is at a low level "0" when the output is negative.

The absolute value circuit 80 which is the combination of two operational amplifiers $OP_5$ and $OP_6$, diodes and resistors, supplies the voltage corresponding to the absolute value of the output voltage of the differential amplifier 60. The voltage-frequency converting circuit 90 is a well-known circuit.

The stepping motor driving circuit 100 is a C-MOS monolithic IC for driving a stepping motor (e.g. PNN8713 of SANYŌ Denki Kabushiki Kaisha). The connection between this IC and stepping motor 200 is shown in FIG. 3.

Figure 4:
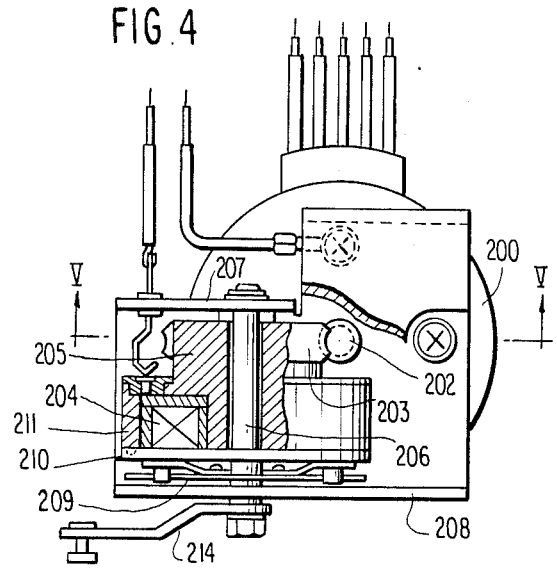
FIG. 4 is a longitudinal partial sectional view showing a motor clutch unit comprised of a stepping motor 200 and an electric clutch 205 in accordance with a first embodiment of the present invention.
Figure 5:
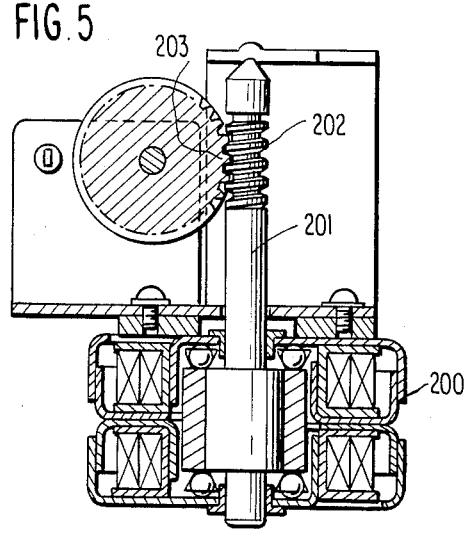
FIG. 5 is a sectional view taken along the line V—V in FIG. 4.
Figure 6:
FIG. 6 is a top view of the motor clutch unit.
Figure 7:
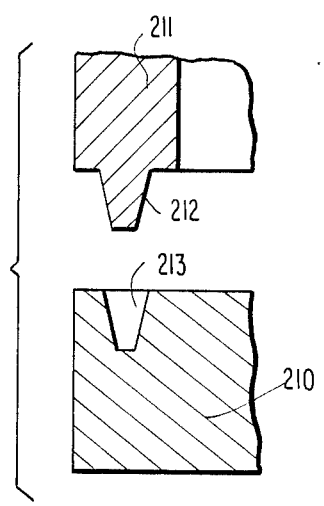
FIG. 7 is an enlarged longitudinal sectional view showing a detailed view of the two clutch members of the clutch 205 in spaced relation to each other.
Figure 8:
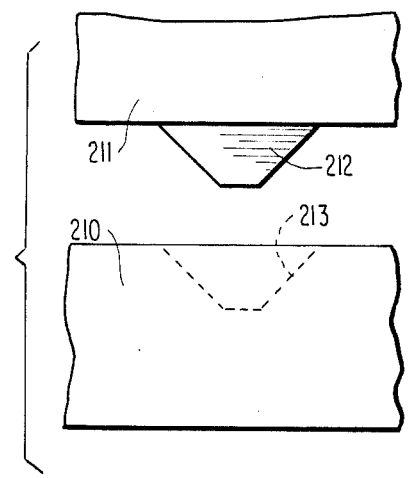
FIG. 8 is a detailed side view of the clutch members shown in FIG. 7.

FIG. 4 is a longitudinal sectional view showing a motor clutch unit which is combined with the stepping motor 200 and the electric clutch 205. FIG. 5 is a sectional view taken along the line V—V in FIG. 4 and FIG. 6 is a top view of the motor clutch unit. As best seen in FIGS. 4–6, upon actuation of the stepping motor 200, the rotation of the motor shaft 201 will be transmitted to the worm gear 203 by means of the worm 202 formed on the shaft 201. The worm gear 203 and the electric clutch 205 are supported on a common shaft 206 which is rotatably mounted in bearing support plates 207 and 208. A movable clutch member or armature 210 is slidably mounted on the support shaft 206 for engagement with an annular clutch member 211 secured to the worm gear 203 for rotation therewith. When the coil 204 is de-energized the clutch member 210 is separated from the clutch member 211 by means of a leaf spring 209 which is carried by the shaft 206. The clutch member 211 is provided with one or more projections 212 as shown in FIGS. 7 and 8 which are adapted to be engaged in complementary recesses 213 in the clutch member 210. When the clutch coil 204 is energized, the clutch member 210 is drawn toward the coil against the force of the spring 209 so that the projection or projections 212 engage the recess or recesses 213 in clutch member 210. In this manner the rotation of the motor shaft 201 is transmitted to the support shaft 206. The bell crank lever 214 is secured to the shaft 206 for rotation therewith with one arm of the bell crank lever being connected to the throttle valve by means of a link 216. Therefore, the operation of the throttle valve is controlled by the rotation of the motor 200 in order to provide the constant speed control.

In the foregoing embodiment the discharge means is comprised of a diode, but it is possible to use other means which cause the flow of current in only one direction. In the foregoing embodiment, the voltage is positive relative to ground, but if the voltage is negative with respect to ground, it is possible that the cathode of the diode be connected to a memory capacitor and the anode of the diode be connected to the voltage power source line.

Figure 9B:
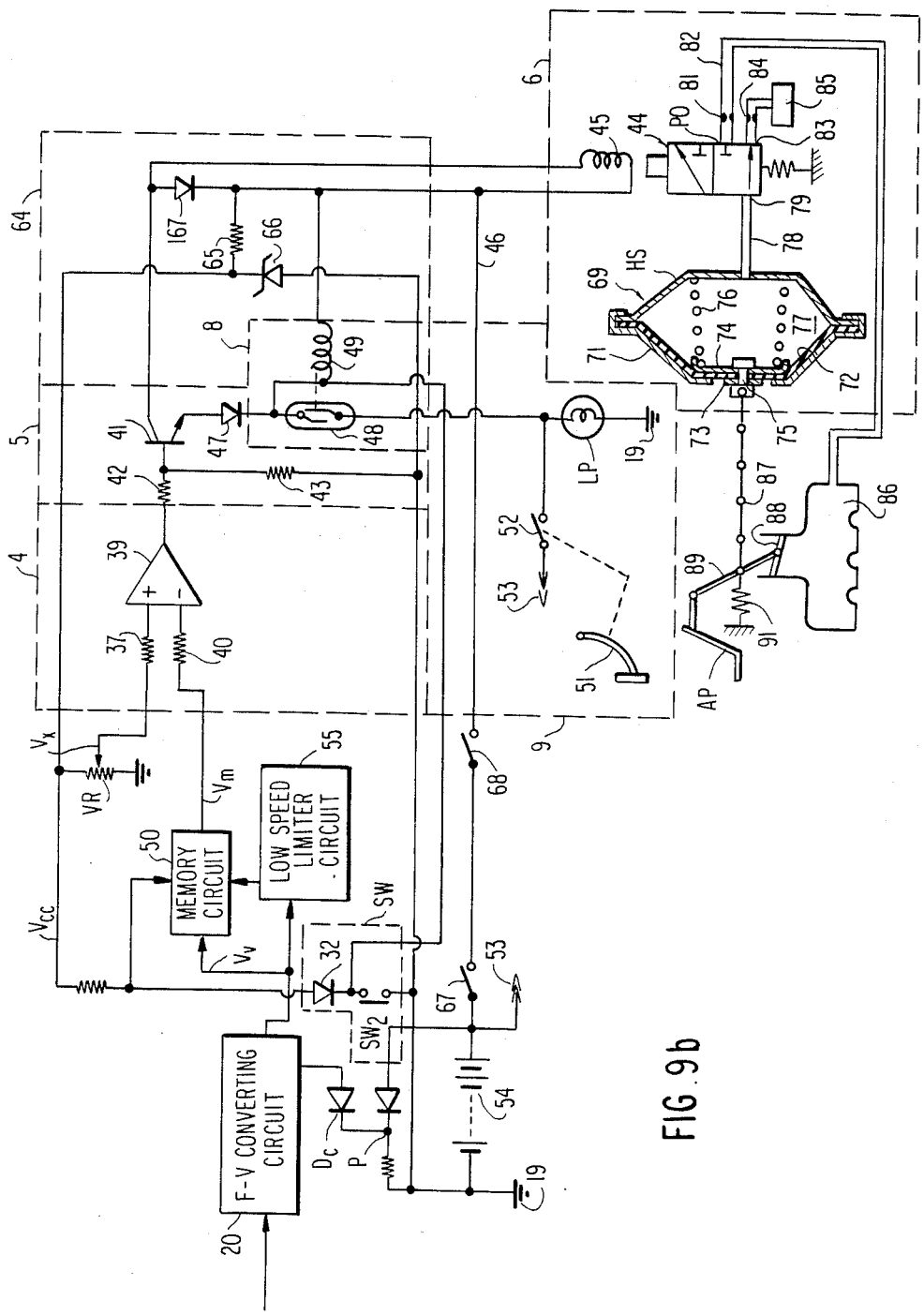
FIG. 9b is a schematic circuit diagram showing the detailed arrangement of the second embodiment according to the present invention.

FIG. 9a is a block diagram showing a schematic representation of a second embodiment of the present invention and FIG. 9b is specific to the actual construction. According to this embodiment, the actual speed signal from the reed switch 3 supplied to the frequency-voltage converting circuit 20 in the same manner as described with respect to the first embodiment and the actual speed voltage signal $V_y$ is supplied to the memory circuit 50. The memory voltage signal $V_n$ and the comparative voltage signal $V_x$ from the variable resistor VR are compared in the comparator circuit 4 and servo-control motor 6 is actuated by the compared signal which is fed through the amplifier circuit 5. Therefore, the output of the engine is controlled. In FIG. 9b the resistor 37 supplies the comparative voltage $V_x$ to the positive input terminal of a voltage level comparator 39 in the comparator circuit 4. The resistor 40 provides an input resistance which connects the negative terminal of the comparator 39 and the output terminal of the memory circuit 50. The comparator 39 is connected between the constant voltage line carrying the voltage $V_{cc}$ and the ground 19. The amplifier circuit 5 includes a transistor 41, the base of which is connected to the output of the comparator 39 through a resistor 42 and to ground 19 through the resistor 43. The collector of the resistor 41 is connected to the power source line 46 through the solenoid coil 45 of the solenoid valve 44 and the emitter of the transistor 41 is connected to a reed relay 48 in the prohibiting circuit 8, the actuator coil 49 of the relay 48 and the cathode of a diode 32 through the diode 47. The other terminal of the reed relay 48 is connected to ground 19 through the brake light LP and the brake switch 52 coupled with the brake pedal 51. The other terminal of the brake switch 52 is connected to the positive terminal of the battery 54 through the line 53 to define the release switch 9. The switch SW includes the normally open switch SW₂ which is operated by the driver and one end of the switch SW₂ is connected to the ground 19 while the other end thereof is connected to the cathode of the diode 32 and the prohibiting circuit 8. The constant voltage circuit 64 is connected from the power source line 46 to the ground 19 through the resistor 65 and the Zener diode 66 and the constant voltage line ($V_{cc}$) is connected to the connecting point between the resistor 65 and the Zener diode 66. The surge absorbing diode 167 is connected in parallel with the solenoid coil 45. The constant speed control system includes the ignition switch 67 and the main switch 68 for the speed control.

The servo control motor 6 comprises the solenoid valve 44 and the vacuum actuator 69. The vacuum actuator 69 is comprised of the diaphragm 72 secured between the housing HS and the cover 71, a pressure plate 74 secured to the center of the diaphragm by means of a rivet 75 and a retainer 73 and a coil spring 76 positioned within the actuator between the pressure plate 74 and the housing HS. The left side of the diaphragm 72 is disposed in communication with the atmosphere and the right side of the diaphragm 72 forms one wall of the pressure chamber 77 within the housing. The pressure chamber 77 is disposed in communication with a port 79 of the solenoid valve 44 by means of a pipe 78. A normally closed port PO of the solenoid valve 44 is connected to the intake manifold 86 of the engine by means of the pipe 82 having a restricted orifice 81 therein. The normally open port 83 is disposed in communication with the atmosphere through a restricted orifice 4 and an air filter 85. The operating link 89 for controlling the position of the throttle valve 88 is connected through the moveable diaphragm by means of a chain 87 which is connected at one end to the rivet 75 and at the opposite end to a fixed abutment through return spring 91. The operating link 89 is also connected to the accelerator pedal AP.

By closing and opening the set switch SW₂, the actual speed at that time is memorized upon the opening of the set switch SW₂ and by closing the set switch SW₂ a current from the power source line 46 flows the coil 49 of the relay 48 and the set switch SW₂ to the ground 19 so that the reed relay 48 is closed. The reed relay remains in the closed state whether the set switch SW₂ opens or closes. Thus, the prohibiting circuit 8 is in the state of non-prohibition. If the memory voltage signal $V_m$ is lower than the voltage $V_x$, the output of the comparator 39 is close to the voltage Vcc of the constant voltage line and the transistor 41 turns ON whereby a current flows from the base of the transistor 41 through the resistor 42 and a current flows from the power source line 46 through the brake light LP through the solenoid coil 45, the collector of the transistor 41, the emitter of the transistor 41, the diode 47 and the reed relay 48. Therefore, the solenoid valve 44 is switched and the vacuum in the intake manifold 86 of the engine is applied to the pressure chamber 77 of the vacuum actuator 69 through the orifice 81, the pipes 82 and 78. Thus, the force generated by the differential pressure acting on the diaphragm 72 causes the diaphragm 72 to move to the right against the force of the coil spring 76 whereby the throttle valve 88 is moved in the opening direction by means of the chain 87. When the voltage of the positive terminal of the comparator 39 is higher than the voltage of the negative input terminal, the transistor 41 turns ON, the solenoid valve 44 is switched and the vacuum is applied to the pressure chambers 77 of the vacuum actuator 69. When the voltage of the positive input terminal of the comparator 39 is lower than the voltage of the negative input terminal, the output of the comparator 39 is close to zero voltage for the ground 19 and the transistor 41 turns OFF. Accordingly, the solenoid valve 44 is returned to its de-energized state whereby the interior of the pressure chamber 77 of the vacuum actuator is connected to the atmosphere. Since the application of a vacuum or atmospheric pressure to the pressure chamber 77 is through the restrictive orifices 81 and 84, respectively, the pressure of the pressure chamber 77 is proportional to the time ratio between the operative and inoperative conditions of the solenoid valve 44. If the actual speed falls below the memory speed, the memory voltage signal $V_m$ falls, and the voltage of the negative input terminal of the comparator 39 falls. Therefore, the output of the comparator 39 is close to the voltage $V_{cc}$ of the constant voltage line and a vacuum is applied to the pressure chamber 77 of the vacuum actuator 69 and the throttle valve 88 is correspondingly open thereby increasing the actual speed. If the actual speed rises above the memory speed, the voltage of the negative input terminal of the comparator 39 rises whereby the output of the comparator 39 is close to the ground level. Therefore, the pressure chamber 77 is connected to the atmosphere, and the throttle valve is correspondingly closed and the actual speed is decreased. Thereafter, the system operates in a constant speed control mode.

FIG. 10 is a circuit diagram of a third embodiment of the present invention. A discharge circuit 30 is considered to be the discharge means in order to practice the present invention. The collector of the transistor $Q_i$ of the discharge circuit 30 is connected to the integrating capacitor $C_c$ of the frequency-voltage converting circuit 20 through resistor $R_h$ and the emitter of transistor $Q_i$ is connected to ground. The base of the transistor $Q_i$ is connected to the collector of transistor $Q_h$ and the base of the transistor $Q_h$ is connected to the constant voltage line $V_{cc}$ through resistor $R_j$. When the line supplies the constant voltage $V_{cc}$, transistor $Q_h$ is in its ON state and the voltage of the base of the transistor $Q_i$ is low. Therefore, transistor $Q_i$ turns OFF and a terminal voltage $V_c$ of capacitor $C_c$ changes in response to a cycle of an actual speed signal. When the voltage $V_B$ drops to zero or cut off (referring to FIG. 2c) the electrical charge of capacitor $C_c$ is discharged and the voltage $V_{cc}$ drops. If the voltage $V_{cc}$ is lower than a predetermined level, transistor $Q_h$ turns OFF whereby the voltage of the base transistor $Q_i$ increases and transistor $Q_i$ turns ON. Thereafter, the electrical charge of capacitor $C_c$ is discharged immediately through resistor $R_h$ and transistor $Q_i$. Therefore, the voltage $V_c$ drops, and the voltage $V_v$ indicates the actual speed signal. When the voltage $V_B$ recovers to a predetermined level, the voltages $V_{cc}$ and $V_r$ rise and if the voltage $V_r$ reaches a predetermined voltage $V_{r1}$, the differential voltage $V_{v1}-V_{r1}$ is memorized in the capacitor $C_d$ whereby FET $Q_d$ turns OFF. However, since the electrical charge of capacitor $C_d$ is discharged previously, the voltage $V_v$ rises slowly in accordance with the voltage $V_{cc}$ and the actual speed signal so that the actual speed signal memorized in capacitor $C_d$ is more slowly acquired than the speed signal memorized previously.

In this third embodiment of the present invention, the discharge circuit 30 is comprised of transistors and detects the level of the stabilized voltage $V_{cc}$. It is possible to change the transistor for a switching element such as a thyristor or an FET and to detect the voltage $V_B$ of the battery.

As will be understood from the foregoing description, if the power source is cut off momentarily, the automobile speed control system prevents the memory voltage signal from changing to another voltage signal higher than before. Thus, the automobile speed control system can safely control the actual speed of the system.

Obviously, many modifications and variations of the present invention are possible in light of the above teaching. It will be understood by those in the art that the foregoing changes and other changes in form and detail may be made therein without departing from the spirit and scope of the present invention.

What is claimed is:

1. An automobile speed control system for automatically controlling the speed of an automobile comprising means for generating a constant voltage, means for generating a pulsating signal corresponding to the actual automobile speed, frequency-voltage converting circuit means including an integrating capacitor for integrating said pulsating signal, said integrating capacitor connected between a base of an output transitor and ground, said base being set to a terminal voltage, circuit means providing a reference voltage, memory circuit means including a memory capacitor having one terminal connected to the output of said frequency-voltage converting circuit means and another terminal connected to the reference voltage means through a switching means, means for providing a comparative voltage, comparing means for comparing an output signal of said memory circuit means and said comparative voltage, means for controlling a throttle valve of an automobile in accordance with the output signal of said comparing means and a discharge means connected to said base of said output transistor for providing a path to ground for discharging said integrating capacitor when said terminal voltage is higher than said constant voltage;

whereby said memory circuit means of said automobile speed control system will not be affected by momentary voltage interruptions.

2. The automobile speed control system of claim 1 wherein said discharge means comprises a first diode having an anode connected to said base and a cathode connected to a second diode; said second diode having an anode connected to a vehicle battery and a cathode connected to said cathode of said first diode, said second diode reverse biasing said first diode under normal conditions preventing said integrating capacitor from discharging through said first diode to ground.

3. An automobile speed control system of claim 1 wherein said discharge means comprises a first semiconductor switch controlling a second semiconductor switch such that when said constant voltage drops below a predetermined level, said first semiconductor switch will cause said second semiconductor switch to establish a path from said base of said output transistor to ground allowing said integrating capacitor to discharge.

* * * * *